United States Patent
Nguyen

(10) Patent No.: US 10,151,396 B2
(45) Date of Patent: Dec. 11, 2018

(54) MULTI-PURPOSE VALVE FOR VACUUMING, DE-VACUUMING, GAS INJECTING AND PRESSURE REGULATING

(71) Applicant: Trong D Nguyen, Sacramento, CA (US)

(72) Inventor: Trong D Nguyen, Sacramento, CA (US)

( * ) Notice: Subject to any disclaimer, the term of this patent is extended or adjusted under 35 U.S.C. 154(b) by 0 days.

(21) Appl. No.: 15/468,215

(22) Filed: Mar. 24, 2017

(65) Prior Publication Data

US 2017/0198824 A1    Jul. 13, 2017

Related U.S. Application Data

(63) Continuation-in-part of application No. 14/953,398, filed on Nov. 29, 2015, now Pat. No. 9,618,130.

(51) Int. Cl.
*F16K 15/20* (2006.01)
*F16K 15/14* (2006.01)
(Continued)

(52) U.S. Cl.
CPC .............. *F16K 15/147* (2013.01); *B65D 1/10* (2013.01); *B65D 31/147* (2013.01); *B65D 47/0842* (2013.01); *B65D 47/32* (2013.01)

(58) Field of Classification Search
CPC ...... F16K 15/147; F16K 15/20; F16K 15/207; F16K 15/14; F16K 15/205; F16K 15/144; B65D 1/10; B65D 31/147; B65D 81/052; B65D 47/32; B65D 47/0842; Y10T 137/2713; Y10T 137/374; Y10T 137/3755; Y10T 137/3771; Y10T 137/3662; A63B 41/00; B60C 23/10; B60C 29/00; B60C 29/002; B60C 29/005; B60C 29/06; B60C 29/066; B60C 23/0496; B64B 1/58; F04B 33/00; F04B 33/005; F04B 53/1037;
(Continued)

(56) References Cited

U.S. PATENT DOCUMENTS 3,159,176 A    12/1964 Russell
3,405,838 A    10/1968 Preisendanz
(Continued)

FOREIGN PATENT DOCUMENTS

WO    1998008748 A    3/1998

OTHER PUBLICATIONS

Vacuvin storage containers, web site, vacuvin.com/286/357/Vacuum-Container-(Small-0,65L), Oct. 2015.
(Continued)

*Primary Examiner* — Craig J Price
(74) *Attorney, Agent, or Firm* — Ernesto Garcia

(57) ABSTRACT

A multifunctional valve features an injection function, a vacuuming function, a devacuuming function with fast and slow mode, and a pressure regulating function. The valve can be implemented on any sealingly closed container having a removable lid or a bag having a resealable zipper or any other similar sealable feature. The valve also features a tethered plug with a latch system to secure it in place to additionally provide sealing. The valve is incorporated into a container with a removable lid for microwave pressure cooking. The same valve is incorporated into a plug to close an opening on a barrel.

18 Claims, 6 Drawing Sheets

(51) Int. Cl.
    *B65D 47/08*     (2006.01)
    *B65D 47/32*     (2006.01)
    *B65D 30/24*     (2006.01)
    *B65D 1/10*     (2006.01)

(58) Field of Classification Search
    CPC ............ F04B 53/1047; F04B 53/1057; A47C 27/081; B63C 9/24; B25B 27/24
    USPC ............ 137/223, 227, 232–234; 220/203.29; 441/41, 90
    See application file for complete search history.

(56) References Cited

U.S. PATENT DOCUMENTS

| | | | |
|---|---|---|---|
| 3,880,187 A | 4/1975 | Kneuseh | |
| 3,941,149 A | 3/1976 | Mittleman | |
| 4,060,219 A * | 11/1977 | Crawford | F16L 37/23 137/614.05 |
| 4,077,429 A | 3/1978 | Kimball | |
| 4,181,145 A | 1/1980 | Mitchell | |
| 4,349,035 A | 9/1982 | Thomas et al. | |
| 4,434,810 A | 3/1984 | Atkinson | |
| 4,653,477 A * | 3/1987 | Akui | A61B 1/00137 128/912 |
| 4,924,899 A * | 5/1990 | Po | A63H 3/06 137/232 |
| 4,926,908 A | 5/1990 | Dschida | |
| 5,031,785 A | 7/1991 | Lemme | |
| 5,071,017 A * | 12/1991 | Stull | B65D 47/2031 215/11.4 |
| 5,083,581 A * | 1/1992 | Jaw | F16K 15/202 137/223 |
| 5,249,598 A | 10/1993 | Schmidt | |
| 5,382,242 A * | 1/1995 | Horton | A61M 16/0463 128/202.27 |
| 5,411,491 A * | 5/1995 | Goldhardt | A61J 15/0092 604/247 |
| 5,535,900 A | 7/1996 | Huang | |
| 5,820,606 A * | 10/1998 | Davis | A61B 17/3462 604/164.11 |
| 5,941,391 A | 8/1999 | Jury | |
| 5,997,546 A * | 12/1999 | Foster | A61J 15/0042 604/96.01 |
| 6,453,940 B1 | 9/2002 | Tipton et al. | |
| 6,637,321 B2 | 10/2003 | Wang | |
| 6,767,340 B2 * | 7/2004 | Willis | A61J 15/0042 604/167.03 |
| 6,908,449 B2 * | 6/2005 | Willis | A61F 5/445 604/103.06 |
| 7,048,136 B2 | 5/2006 | Havens et al. | |
| 7,108,147 B2 * | 9/2006 | Cheung | F16K 17/28 137/533.31 |
| 7,226,411 B2 * | 6/2007 | Akiba | A61B 1/018 600/104 |
| 7,243,676 B2 | 7/2007 | Bailey | |
| 7,954,515 B2 * | 6/2011 | Gerst | F16L 55/1141 138/89 |
| 7,985,232 B2 * | 7/2011 | Potter | A61B 17/3421 604/160 |
| 8,123,086 B2 * | 2/2012 | Haley | B65D 47/06 215/309 |
| 8,146,765 B2 | 4/2012 | Chen | |
| 8,333,693 B2 * | 12/2012 | Hamazaki | A61M 39/0606 600/153 |
| 8,337,470 B2 | 12/2012 | Prasad et al. | |
| 8,584,695 B2 * | 11/2013 | Lau | F16K 15/202 137/232 |
| 9,618,130 B1 * | 4/2017 | Nguyen | F16K 15/147 |
| 2003/0045841 A1 * | 3/2003 | Palcisko | A61J 15/0092 604/256 |
| 2003/0150487 A1 | 8/2003 | Wu | |
| 2005/0072788 A1 * | 4/2005 | Lieberman | A47G 19/2272 220/714 |
| 2005/0187524 A1 * | 8/2005 | Willis | A61F 5/445 604/256 |
| 2008/0196768 A1 * | 8/2008 | Steffan | F16L 55/115 137/232 |
| 2008/0223449 A1 * | 9/2008 | Culp | F16K 15/202 137/232 |
| 2009/0018508 A1 * | 1/2009 | Fisher | A61M 25/0017 604/167.04 |
| 2009/0139582 A1 * | 6/2009 | Franta | F16K 15/202 137/232 |
| 2010/0043914 A1 * | 2/2010 | Pansegrouw | A63B 41/12 141/10 |
| 2010/0176152 A1 | 7/2010 | Johnson | |
| 2012/0161044 A1 | 6/2012 | Chen | |
| 2012/0285552 A1 * | 11/2012 | Song | F16K 15/20 137/223 |
| 2014/0074035 A1 * | 3/2014 | DeTroy | A61M 39/26 604/167.04 |

OTHER PUBLICATIONS

Vacuware, web site, vacuware.com, Oct. 2015.
Kinetic Premier containers, web site, www.kinetic-cookware.com/premier, Oct. 2015.
Vacuumsaver, web site, www.vacuumsaver.com/product/?type_id=7, Oct. 2015.
Foodsaver containers, web site, www.foodsaver.com/accessories-and-parts/containers/, Oct. 2015.
Vemay Flow Controls, web site, www.vemay.com/Markets/Medical/Product-Categories/Combination-Valves.aspx, Oct. 2015.
Minivalve combination valves, web site, www.minivalve.com/newsite/index.php/en/by-type/duckbill-umbrella-combination-valves/how-they-work, Oct. 2015.

\* cited by examiner

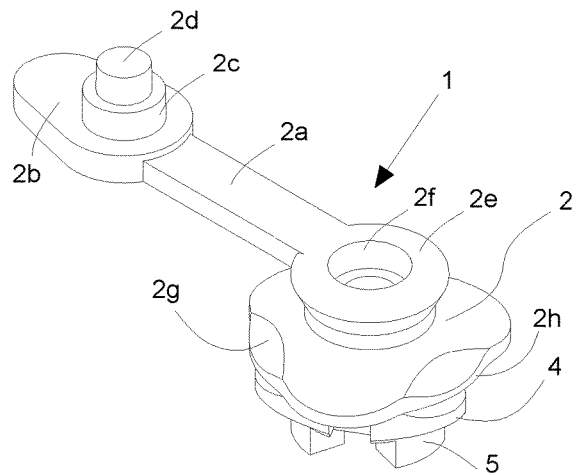
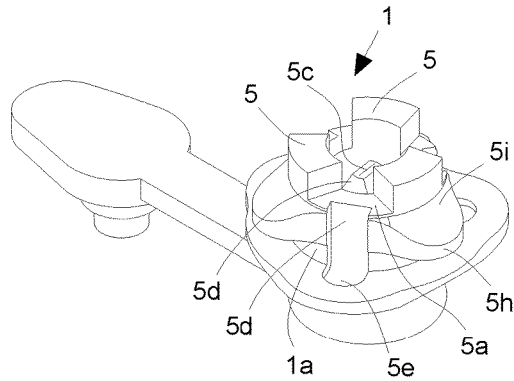
Figure 1
Figure 2
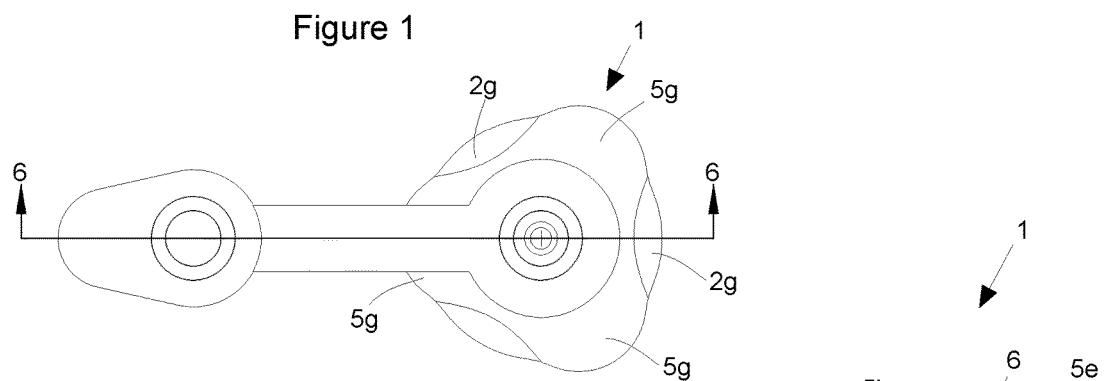
Figure 3
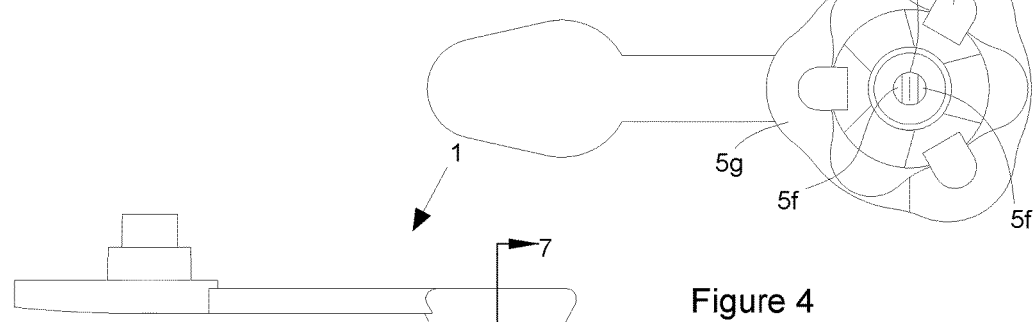
Figure 4
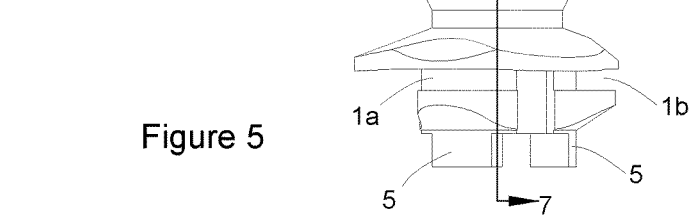
Figure 5

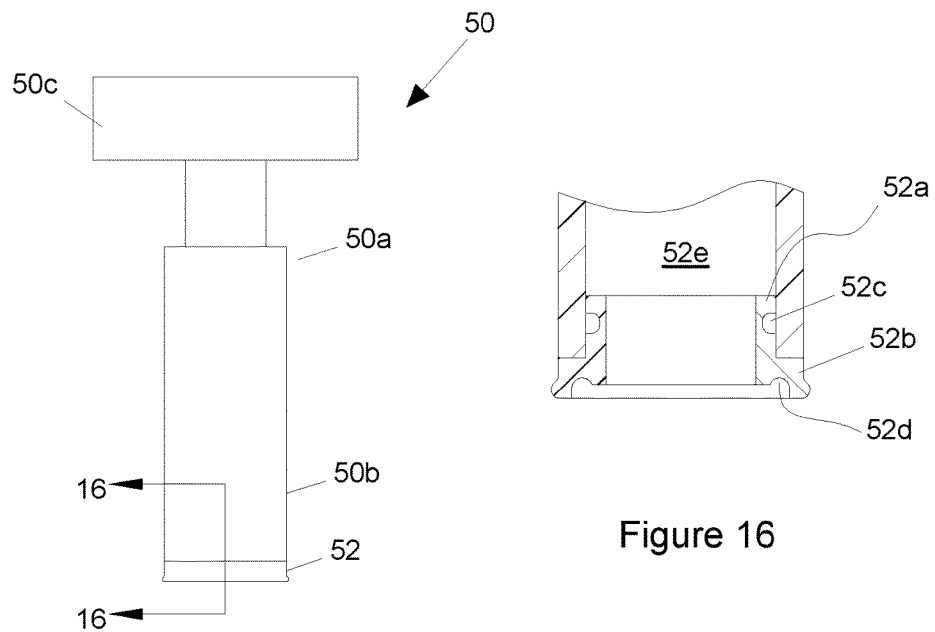
Figure 15
Figure 16
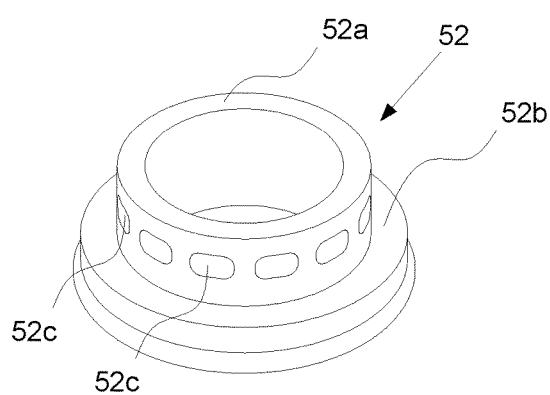
Figure 17
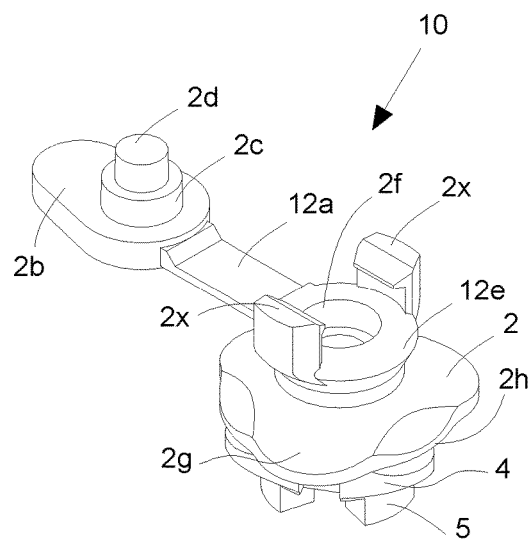
Figure 18

MULTI-PURPOSE VALVE FOR VACUUMING, DE-VACUUMING, GAS INJECTING AND PRESSURE REGULATING

FIELD OF THE INVENTION

This disclosure is generally directed to a multi-purpose valve to be used with a vacuum pump or an injection pump that injects a gas such as nitrogen to extend the life of organic material. Additionally, this multi-purpose valve can also be used as a pressure regulator to maintain desirable internal pressure of any sealed container during cooking in a microwave oven or lacto-fermenting of vegetables.

BACKGROUND OF THE INVENTION

One-way valves are known in the art for food preservation. The applicant acknowledges that many have designed one-way valves to function in a similar fashion to vacuum air off a container. While prior art one-way valves only do vacuuming, no one has designed a valve where one has the option to inject to fill with gas, flush or vacuum a gas off a container, or maintain a safe pressure level inside a container to avoid explosion or undesirable vacuum.

The closest prior known art is to Chen, U.S. Publication 2012/0161044 A1, which teaches a one-way valve to vacuum a closed container. The valve features a nipple and air passages that allow air to escape as one vacuums the container. Chen further uses an inverse hook that projects past a hole in a closed container. The inverse hook assimilates part of this invention in a structurally different way.

Microwave cooking: It's not advisable to heat or cook with a sealable container in a microwave oven with the lid on unless it has a steam vent. This is because the steam pressure built up during cooking will cause lid to explode or a vacuum developed as the container is cooling down after cooking and making it difficult to remove the lid. As such, it is not possible to use ordinary household sealable containers as a steam pressure cooker in a microwave oven.

Lacto fermentation: Lacto fermentation of vegetables is practiced by all cultures all over the world because it is a very effective way of preserving surplus vegetables to later use, while enhancing their nutritional values and contributing beneficially to probiotic health of the consumers. The process involves creating an anaerobic condition by submerging cut up vegetables in a brine solution in enclosed vessels or jars so the anaerobic lactic acid bacteria (LAB), which is salt tolerant and naturally present on all vegetables, could digest the vegetables and produce lactic and acetic acids and carbon dioxide gas. It is essential that air is excluded as much as possible at the onset of this process to control the pectin-destroying activities of yeast and mold, spoilage, or control unsightly floating Kahm yeast as the LAB culture is getting established. It is well known that the more pectin is lost the less crunchy and mushier the vegetables will become. As this process is progressed, the built-up CO2 gas must be released or burped regularly in a way that air or insects and flies cannot enter. Typically a cumbersome airlock device is used for this purpose, which must be removed at the end of the process for refrigeration storage. The present invention offers unique improvements and advantages to this process by vacuuming to remove air bubbles trapped to the submerged vegetables and air in the headspace of the fermenting vessel at the onset and by allowing self-burping during fermentation and convenient storage after fermentation since there is no airlock to remove.

SUMMARY OF THE INVENTION

The present invention describes a multi-functional valve for injecting a gas, or flushing or vacuuming out a gas from a closed volume such as a container or sealable bag. The valve includes a duckbill with a slit at one end that can be further sealed with a tethered plug that fits into an opened nipple at the other end. As such the valve of the present invention can be reverted to a one-way valve whenever the duckbill is closed by the tethered plug. The valve also incorporates a footing that provides clearance to the duckbill as one injects a gas or vacuums the closed volume. The duckbill further features opposed tapered outside surfaces to assist in providing radial forces to close the slit.

Similar to other one-way valves, the instant valve includes at least one axial passageway in flow with a radial passageway partly under a collapsible flap to let gas escape as one vacuums the closed container. When one manually presses down on the opened nipple, at least one of the flaps will collapse and break the vacuum. An improvement is the combination with the one-way feature of the valve with the duckbill and separate passageways, which allows for injection of a gas through the duckbill and have it fill and flush the container by pushing any air inside a container to exist through the axial and radial passageways. This is merely done by putting a nozzle of the injecting can against the valve and pressing further to have the flap collapse to open the valve in a way acting as a two-way valve or put the valve in a flush mode. In another mode, the nozzle can slightly rest on the valve without pressing further and merely make the valve fill the container using pressure. This is called the fill mode.

It is envisioned that the valve will work with a cap of a container that has a thread or any other fastening means for keeping the container closed. It is envisioned that the valve includes a retaining gap where a support wall of the container is retained when the valve passes through an opening in the cap. In most instances, the retaining gap has a dimension that is similar to a wall thickness of the support wall. In instances where the support wall is thin such as a resealable bag or a thin sheet metal cap, a spacing washer is used to take up space keeping the valve held down.

The valve is envisioned to allow one to flush a bowl or cooking pot with gas and then vacuum to create a negative pressure inside to hold the lid in place to keep the gas in and air out. Flushing will entail filling the container with gas, while pushing any air inside the container out until a desired level of gas has entered the container. When the time comes to take the lid off, one can devacuum or break the vacuum gently to avoid splashing of liquid inside by removing the tethered cap. Removing the tethered cap will slowly break the vacuum. To break the vacuum much faster, one simple pushes the nipple to the side thus devacuuming faster. One other benefit of the flush and fill method, and then vacuum is to reduce the volume of gas required to bring oxygen down to a desired level. For example, it takes 4× the volume (headspace inside a container) of gas to bring oxygen from 21% to 1.5%, but only 2× of volume of gas to achieve 5.25% and then vacuum to get to 2% of oxygen. Vacuuming by hand pump or a typical powered pump can only reduce oxygen by about half.

The present invention will provide a simple and low cost means to convert any sealable microwave-able containers into a steam pressure cooker as both pressure and vacuum are compliantly regulated. Additionally, the present invention details a method of lacto-fermentation using the instant valve.

BRIEF DESCRIPTION OF THE DRAWINGS

FIG. 1 shows an isometric top view showing a valve.

FIG. 2 shows an isometric bottom view of the valve shown in FIG. 1.

FIG. 3 shows a top view of the valve shown in FIG. 1.

FIG. 4 shows a bottom view of the valve shown in FIG. 1.

FIG. 5 shows a side view of the valve shown in FIG. 1.

FIG. 15 shows a generic vacuum pump utilizing a novel pump shoe.

FIG. 16 shows cross-sectional view 16-16 in FIG. 15 showing a lower area of a generic vacuum pump.

FIG. 17 shows an isometric view of the novel pump shoe used in a generic vacuum pump.

FIG. 18 shows an isometric view of a second embodiment of the valve.

DETAIL DESCRIPTION OF THE DRAWINGS

Figure 10:
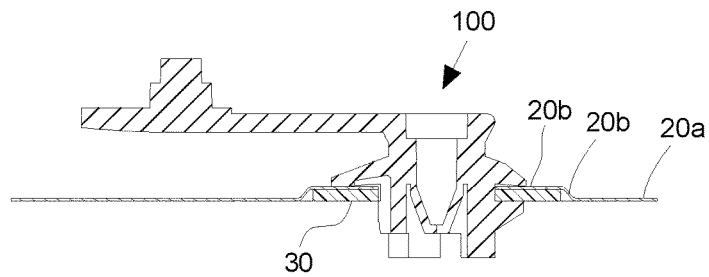
FIG. 10 shows cross-sectional view 10-10 shown in FIG. 8.

FIGS. 1 to 5 show a multi-purpose valve 1. The valve 1 features a hollow core 1a separating a first annular flange 2 and a second annular flange 4. A nipple 2e projects from the first flange 2. The first annular flange 2 has three spaced apart flaps 5g that thin out in thickness toward a distal end. Between two of the spaced apart flaps 5g is a connecting ledge 2h having a cutout 2g for reducing the connecting ledge 2h thus providing more flexibility to the flaps 5g, see FIG. 1. At least three axial vents 5d extend along the core 1a each into a radial vent 5e that is under each of the flaps 5g. A bore 2f extends from the end of the nipple 2e into the core 1a so as to make the valve 1 one-way valve and thus collapse to open under pneumatic load. The bore 2f can be a counterbore or a straight opening. FIG. 10 shows the valve 1 in a closed state. The height of the core 1a can be longer than the thickness of a wall of an end cap or can be adjusted to match the wall thickness of an end cap.

Figure 6:
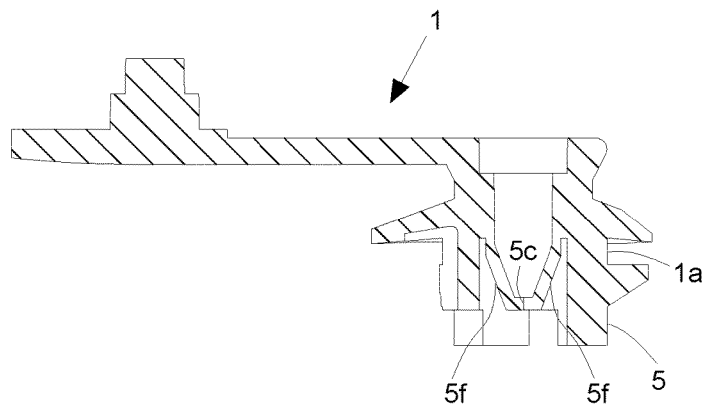
FIG. 6 shows cross-sectional view 6-6 shown in FIG. 3.
Figure 7:
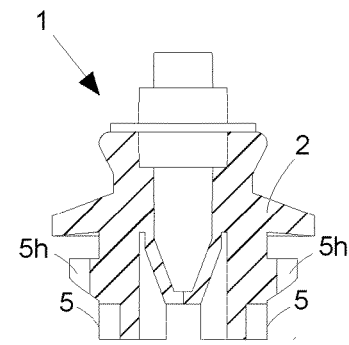
FIG. 7 shows cross-sectional view 7-7 shown in FIG. 5.

FIGS. 1 and 2 show the dual-purpose valve 1 further including a cap 2b that is tethered to the nipple 2e through a bridge 2a. The cap 2b includes a flange 2c that projects from cap 2b. A boss 2d projects from the flange 2c and is coaxial with the flange 2c. The flange 2c and the boss 2d are designed to frictionally fit inside the bore 2f so as to be retained therein. The valve 1 further includes a duckbill 6 that extends coaxially from the bore 2f. The duckbill 6 is radially spaced from the core 1a as seen in FIGS. 6 and 7. The duckbill 6 comprises a hollow cone having a slit 5c at one end of the cone. The slit 5c provides a passageway for gas to pass through. A pair of opposed tapered flats 5f interrupt the outer periphery of the cone. The tapered flaps 5f assist in closing the slit 5c when positive pressure has reached inside a container.

As seen in FIGS. 1, 2, and 4, the second annular flange 4 comprises three retainers 5h each with a tapered guide 5i to assist the valve 1 to be placed in a circular opening. Projecting from the second annular flange 4 are three circumferentially spaced feet 5 which provide three channels 5a for gas to pass through. The purpose of the three spaced feet 5 is to prevent the valve 1 from sealing against a flexible wall of a sealable bag when either injecting gas or vacuuming the bag. The three spaced feet 5 space away a free end of the duckbill 6 from sealing as seen in FIGS. 6 and 7.

Figure 8:
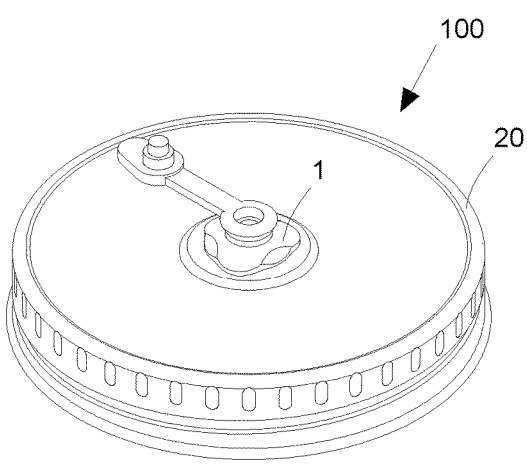
FIG. 8 shows an isometric view of a Mason jar cap utilizing the valve in FIG. 1.
Figure 9:
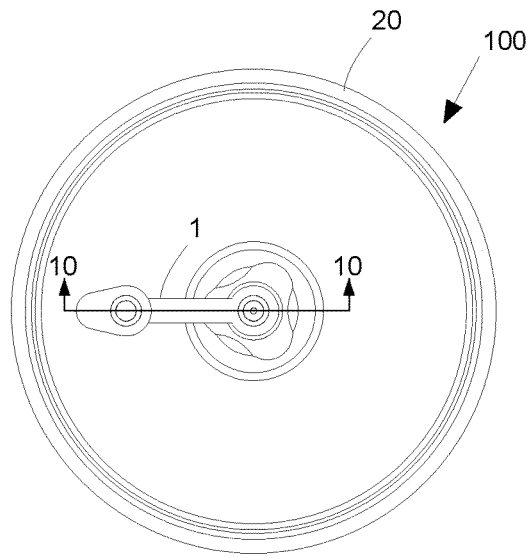
FIG. 9 shows a top view of the Mason jar cap shown in FIG. 8.

FIGS. 8 to 10 show a cap assembly 100 comprising the valve 1 mounted to a Mason jar cap 20. As best shown in FIG. 10, the Mason jar cap 20 includes a hole in a stamped out circular projection 2b that extends from a support wall 20a. The circular projections 2b forms a cylindrical cavity 20c enclosing a plastic washer 30 that is bonded to the circular projection 2b. The plastic washer 30 provides a filler to take up the space needed to keep the valve 1 when used with a thin support wall 20a as the gap 1b between the annular flanges 2, 4 would be less than the thin wall especially when the valve 1 is used in thin sheet metal caps, thin plastic caps, or resealable bags.

Figure 11:
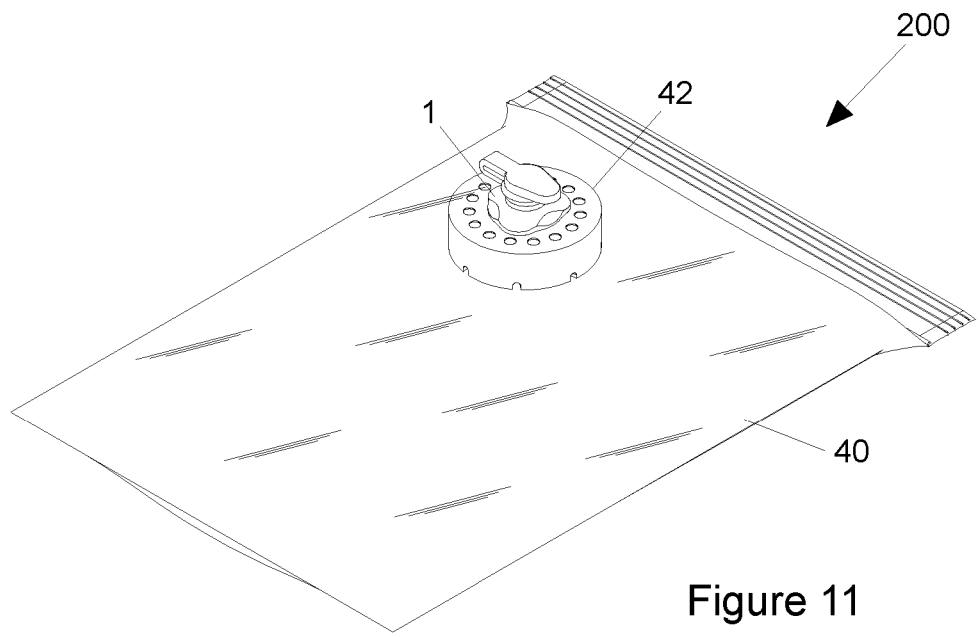
FIG. 11 shows an isometric view of a resealable bag utilizing the valve of FIG. 1.
Figure 12:
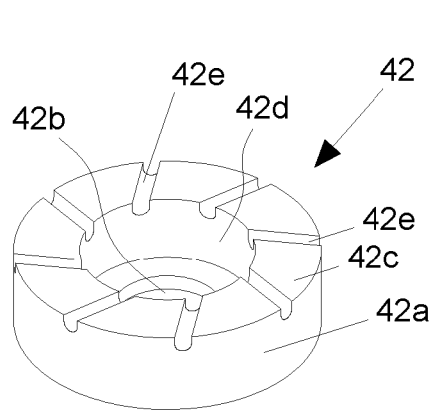
FIG. 12 shows an isometric top view of the footed washer used in the resealable bag shown in FIG. 11.
Figure 13:
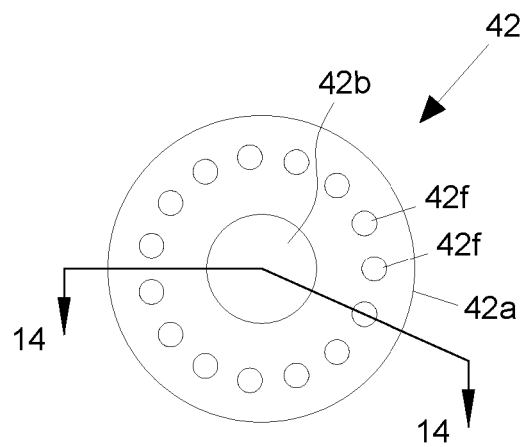
FIG. 13 shows an isometric bottom view of the footed washer used in the resealable bag shown in FIG. 11.
Figure 14:
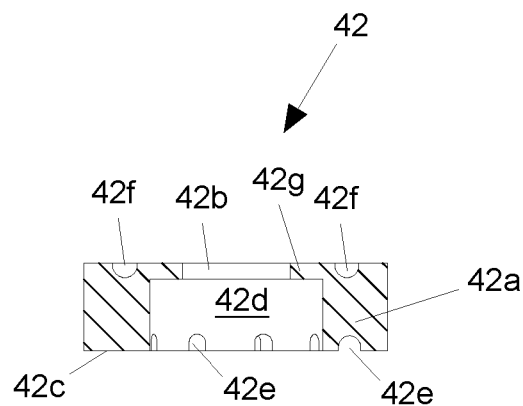
FIG. 14 shows a bottom view of the footed washer shown in FIG. 11.
Figure 19:
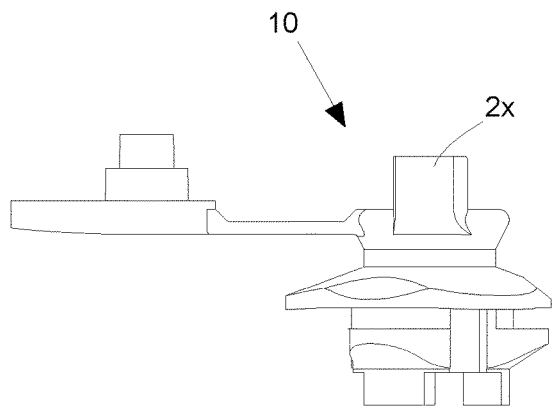
FIG. 19 shows a side view of the valve shown in FIG. 18.
Figure 20:
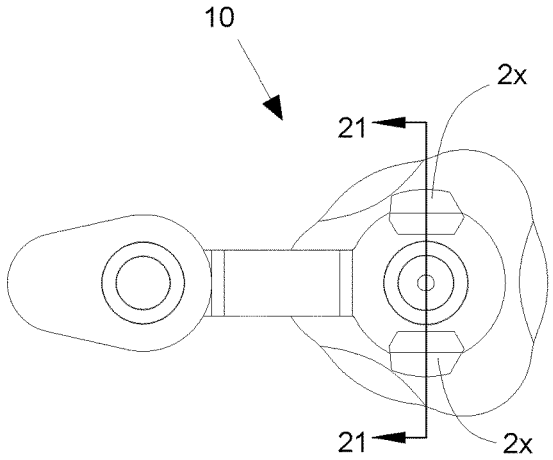
FIG. 20 shows a top view of the valve shown in FIG. 18.
Figure 21:
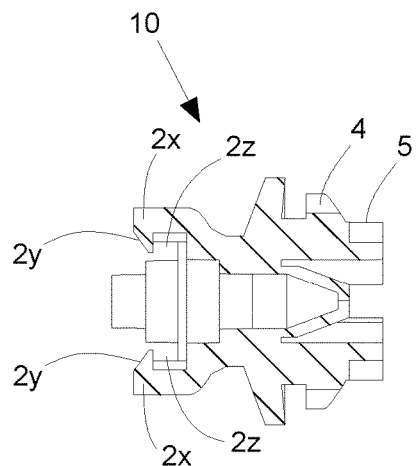
FIG. 21 shows cross-sectional view 21-21 shown in FIG. 20.
Figure 22:
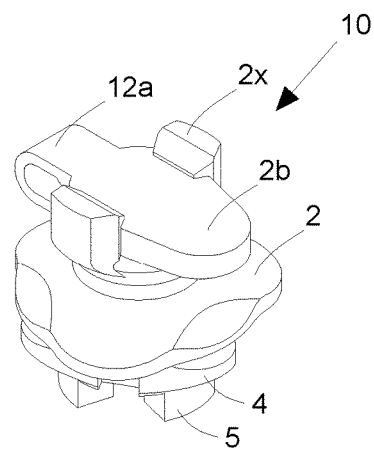
FIG. 22 shows an isometric view of the second embodiment of the valve in a closed position.

FIGS. 11-13 shows a sealable bag assembly 200 comprising the valve 1 shown in FIG. 1 mounted to a sealable bag 40. FIG. 11 shows as best a clear sealable bag 40 but of course the bag can be opaque or colored. In this alternative application, a washer 42 is retained through the valve 1 passing directly to the inside of the sealable bag 40 and aligned with a hole, not shown, in the bag 40. The washer 42 as shown in FIGS. 12 and 13, comprises an annular body 42a with a central opening 42b for the valve to pass through. The central opening 42b opens up to a counterbore 42d forming an annular step 42g for the valve to sit properly similarly as shown in FIG. 10. At one face of the washer 42, a series of angled grooves 42e extend from an outside surface of the annular body 42a towards the counterbore 42d to allow a conduit passage for air or gas to pass through. Between the angled grooves 42e is a standoff 42c. The grooves 42a are oriented in a circular circumference along the washer 42a and prevent any food containment from clogging the valve's operation. As seen in FIG. 13, the opposite face of the washer includes a series of circumferentially spaced vacuum cavities 42f to allow the washer 42 to vacuum seal with the sealable bag 40. As one vacuums the bag 40 with the valve 1 in place, the bag 40 will collapse into the vacuum cavities 42f and thus further prevent the washer 42 from moving. Furthermore, the configuration of the angled grooves 42e prevents a flexible wall of the plastic bag from collapsing onto the grooves 42e under vacuum to block air flow.

FIG. 15 shows a generic vacuum pump 50 typically used for wine bottles so its inner diameter is about 1.02"(26 mm). The pump is usually comprised of an outer telescoping tube 50a, an inner telescoping tube 50b and a handle 50c. The invention incorporates a novel pump shoe 52 that can fit any generic vacuum pump regardless of its outer shape. As seen in FIGS. 16 and 17, the pump shoe 52 is made of food grade silicone. The pump shoe 52 includes a main body 52a comprising a cylindrical wall with an internal opening 52e sized to fit the valve 1 when the valve 1 is capped. An external annular flange 52b extends from main body 52a. The main body 52a includes as series of vacuum cavities 52c around the perimeter of the main body 52a to allow the main body 52a to grip inside an internal surface of the outer telescoping tube 50b. At the bottom of the pump shoe 52 is an annular groove 52d facing downward of the annular flange 52b to also provide for a vacuuming effect when one presses the vacuum pump against a container or a sealable bag.

FIGS. 18-22 show a second embodiment of the valve 10 having similar features as valve 1. Valve 10 includes a latch system comprising a pair of hooks 2x that retain the tethered cap 2b further secured in addition of having the tethered cap 2b being frictionally engaged with the nipple 12e. Similarly as valve 1, the valve 10 includes a tether 12a. The hooks 2x include a tapered surface 2y to guide the cap 2b into the hooks 2x to be retained therein in undercuts 2z. When one wishes to open the valve, one can use the tapered surfaces 2y and spread the hooks 2x open to allow the cap to be removed from the nipple 12e.

Figure 23:
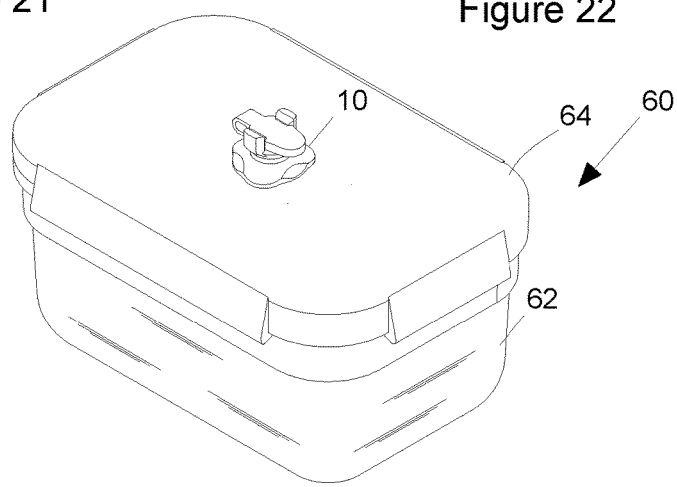
FIG. 23 shows an isometric view of a container utilizing the valve shown in FIG. 18.
Figure 24:
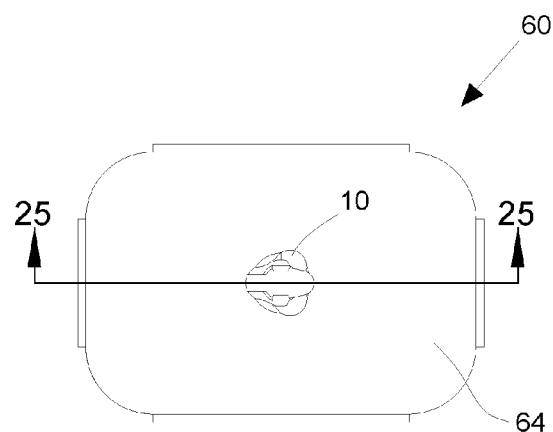
FIG. 24 shows a top view of the container shown in FIG. 23.
Figure 25:
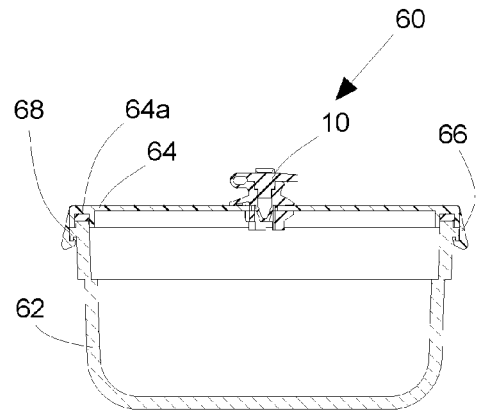
FIG. 25 shows cross-sectional view 25-25 shown in FIG. 24.

FIG. 23 shows a rectangular container 60 having a plastic lid 64 and a glass receptacle 62. This glass container 60 has ordinary closing flaps 66 as shown in FIG. 25 that hook to a lip 68 around the rim of the receptacle 62. A seal 64a housed in the lid 64 provides a tight seal when the container 60 is closed. It admitted here that the container 60 per se is not the crux of the invention but rather the use of the valve 1, 10 in conjunction with the container. The valve 10 seats in a hole through the plastic lid 64. No washer is needed under the lid 64. The thickness of the lid provides enough support to keep the valve 10 from coming out. It is envisioned that the shape of the container can vary from any known shape.

Figure 26:
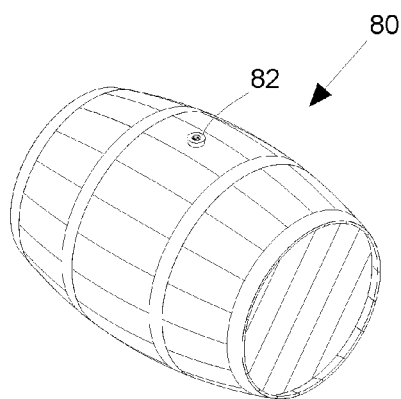
FIG. 26 shows an isometric view of a common barrel.
Figure 27:
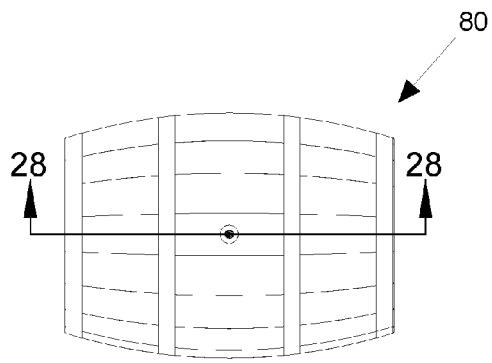
FIG. 27 shows a top view of the barrel shown in FIG. 26.
Figure 28:
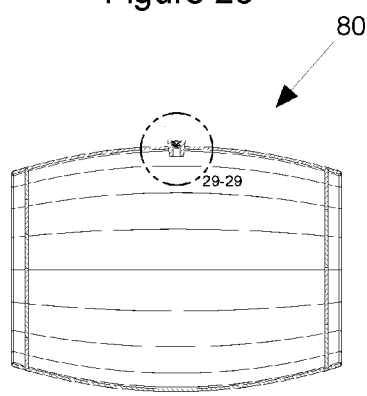
FIG. 28 shows cross-sectional view 28-28 shown in FIG. 27.
Figure 29:
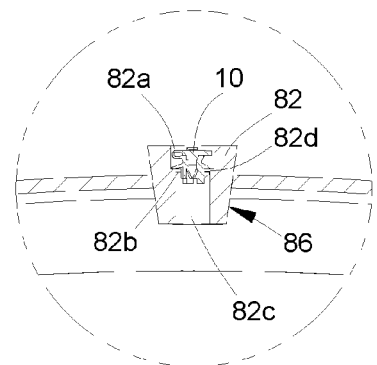
FIG. 29 shows a blown-up view 29-29 shown in FIG. 28.

FIGS. 26-28 show a common wooden barrel 80 which has a plug 82. Details of the plug 82 are shown in FIG. 29. The plug 82 can be made of rubber with a tapered outside wall 86. The plug 82 features a first bore 82a and a second bore 82c that is smaller than the first bore. Between the two bores 82a, 82c is a support wall 82b which contains a hole 82d where the valve 10 is fixed therein. The depth of the first bore 82a is such to entirely house the valve 10 when the valve 10 is closed. Similarly as the container lid 64, there's no need for a washer to be adjacent the hole 82d. It envisioned that the plug 82 can be used with other types of barrels 80 made of different known materials and not just wooden barrels.

It is envisioned that the valve 1, 10 is to be made from a flexible material such as food grade silicone rubber or thermoplastic elastomer (TPE) of a desirable durometer. The washer alternatively can be made of a rigid material such as any metal or food grade plastic material. It is envisioned to inject a gas, through the valve, into a container using a pressurized source. It is envisioned that a hose will have a cylindrical fitting, not shown, that fits inside of the bore 2f or part of the counterbore to fill the volume of the container. The pressure coming from the gas source will allow the slit 5c to open up and as the container reaches a sustainable pressure the duckbill 6 will close itself and thus close the slit 5c. In this manner, the duckbill 6 is not touched or contaminated by the gas nozzle. While the dual-purpose of the valve 1, 10 is to fill a container with any type of gas, it is envisioned that a vacuum pump can be used to remove any gas inside a container to preserve organic material inside the container as well. The vacuum pump will be designed to have a sealable rubberized rim that will form a closed space with the surround surface of the valve 1 to vacuum air or gas from inside the container when the tethered cap 2b is closing the duckbill of valve 1, 10.

The invention is envisioned to be applied to many types of containers especially those that have any removable cap or lid using a thread connection, a hinging snap connection, any locking safety feature, or without any connection to the container. The negative pressure created during vacuuming can cause a lid to fix itself to a jar for instance. The cap or lid can be fixed to the container via a hinging feature or using a live hinge as commonly known in the art.

The present invention's structure uniquely offers five benefits to enclosed containers:
1. burp,
2. fill,
3. flush,
4. vacuum, and,
5. controllable de-vacuum in 2 modes, slow or fast.

Of the five benefits, filling valves for sport balls, etc., and vacuuming for wine bottles and food containers are well known in the art as far what one can do with a valve. However, burping, flushing, and controllable de-vacuuming are not. The flushing action requires injection with a nozzle pressing down on the valve to flex the three flaps 5g to let air out while filling is taking place. Burping refers to releasing gas when the inside pressure is higher than the closing force of the valve. The instant valve 1 assists in creating negative pressure by closing the lid and pressing hard on the lid to create a high pressure condition inside and therefore release or burp some air or gas out of the container to generate negative pressure inside afterward.

One of the benefits of the valve is to use it with several processes. For instance, the valve can make any sealable microwave compatible container into a steam pressure cooker in a microwave oven. The lid of a microwave compatible container forms an air and moisture tight seal. The lid can have a native round hole, or the hole can be drilled or punched. Once drilled, the valve is mounted onto the hole. Thereafter, the tethered cap is disengaged and the container placed in the microwave for cooking. During that time, the umbrella valve releases built-up internal steam pressure of the container when such pressure is surpassed its designed limit through the umbrella valve. Once cooked, the duckbill valve allows air to enter the container through the valve when a vacuum is developed as the container is cooling down after cooking or heating. A residual vacuum would remain at the level dictates by the native closing force of the duckbill. If any residual vacuum remains, the vacuum can be eliminated when pressing or pushing sideway on the nipple so the lid can be easily removed from the container.

In addition to using the valve in microwave cooking, the valve can be used in a lacto-fermentation process as a simple and fail-safe process, in particular, in lacto-fermentation of vegetables in a jar or container. The following steps take place in the process. Trapped submerged air bubbles, intercellular air inside the vegetables and air in the headspace are removed by vacuuming. Fermenting medium, typically water or brine solution, added, quickly penetrates the vegetables as the vacuum condition is created. As pressurized carbon dioxide gas is produced by the lactic acid bacteria (LAB), the gas is released automatically from the jar or container eliminating the need for periodic burping during the fermentation process. The pressurized carbon dioxide gas could be used to automatically force the fermenting solution out and fresh brine solution then is added and therefore diluting undesirable taste components such as bitter oleuropein leached out from olives during the fermentation process. The diluting process is carried out conveniently with removing the lid.

To carry the process, these steps and initial conditions are needed. The lid of the fermenting container needs to form a tight seal to prevent air and moisture leaking in. The lid needs to have a compatible native hole, or the hole can be drilled or punched. The valve disclosed herein is mounted onto the hole of the lid. The tethered cap is inserted and secured by the hooks of the latch system to make the valve one-directional valve. The umbrella valve will act as vacuum valve when engaged with a vacuum pump, manually or electronically powered, to extract air from and create a vacuum inside the container. An appropriate amount of cut up vegetables is placed inside the container. A brine solution is poured onto the vegetables to cover them but leaving sufficient headspace below the opening of the container. The lid is placed on the container and thereafter the container is vacuumed. An appropriate vacuum device is used to create a vacuum inside the container to reduce the oxygen level of the headspace to about 10%. The fermenting container is then placed at room temperature for optimal fermentation by LAB until no more carbon dioxide bubbling is observed in the fermenting solution. The fermenting container can now be stored in a cold environment such as a refrigerator or basement to stop further fermentation and to be consumed.

An additional tube with a shut-off valve extending from 0.5" above to 2-3" below the lid and connected to a receiving or brine reservoir wherein the fermenting solution is forced out by built-up carbon dioxide pressure until its level is below the tube and fresh brine solution is injected through the tube to refill by vacuuming action. Undesirable flavor or taste developed in the fermenting process is therefore diluted and reduced. The entire procedure is carried out without removing the lid.

The invention claimed is:

1. A valve comprising a first annular flange, a second annular flange, a nipple, a hollow core, and a cap;
   wherein the core separates the flanges from each other establishing a gap between the flanges;
   wherein the nipple comprises a bore;
   wherein the cap comprising a flange extending from the cap to frictionally seal the bore;
   wherein a duckbill extending from the bore and including a slit; and,
   wherein the nipple further including a pair of hooks to further retain the cap when the flange of the cap is sealed inside the bore;
   wherein the valve in combination with a washer to be retained between the two annular flanges;
   wherein the washer comprises an annular body including a hole to receive the hollow core of the valve;
   wherein the valve further in combination with a support wall including a circular indentation offsetting the support wall into a cavity and a central hole;
   wherein the washer is adhesively bonded to the cavity;
   wherein the first annular flange engages the circular indentation; and,
   wherein the second annular flange resting against the washer.

2. The valve of claim 1, wherein at least one footing projecting from the second annular flange and a channel delimits the at least one footing for air flow to access the slit.

3. The valve of claim 2, wherein one more channel delimits the at least one footing into two footings for air flow to access the slit.

4. The valve of claim 1, wherein the second annular flange includes at least one tapered surface to provide a guide for insertion to a hole in a container.

5. The valve of claim 4, wherein the second annular flange comprises at least two retainers and the tapered surface being on each of the retainers.

6. The valve of claim 5, wherein an axial vent extends between the two retainers and the hollow core; and,
   wherein a radial vent extends partly along the first annular flange.

7. The valve of claim 1, wherein the cap is tethered to the nipple.

8. The valve of claim 1, wherein the support wall comprises a jar cap.

9. The valve of claim 1, wherein the first annular flange comprises at least two flexible tapered flaps, and a connecting ledge between the flaps; and,
   wherein the connecting ledge includes a cutout to provide flexibility to the flexible tapered flaps.

10. The valve of claim 1, wherein the hooks further including a tapered surface to axially guide the cap into undercuts of the hooks.

11. A valve comprising a first annular flange, a second annular flange, a nipple, a hollow core, and a cap;
    wherein the core separates the flanges from each other establishing a gap between the flanges;
    wherein the nipple comprises a bore;
    wherein the cap comprising a flange extending from the cap to frictionally seal the bore;
    wherein a duckbill extending from the bore and including a slit; and,
    wherein the nipple further including a pair of hooks to further retain the cap when the flange of the cap is sealed inside the bore;
    wherein the valve in combination with a washer to be retained between the two annular flanges;
    wherein the washer comprises an annular body including a hole to receive the hollow core of the valve;
    wherein the valve further in combination with a support wall including a circular hole;
    wherein the hole of the washer is concentric to the circular hole of the support wall and the hole of the washer opening to a counterbore forming a step;
    wherein the first annular flange engages the support wall; and,
    wherein the second annular flange resting against the step of the washer.

12. The valve of claim 11, wherein the support wall comprises a sealable bag.

13. The valve of claim 11, wherein the washer further includes standoffs at one face and grooves between the standoffs;

wherein the standoffs are circumferentially and angularly spaced along the washer; and, wherein an opposite face of the washer including a series of circumferentially spaced vacuum cavities.

14. A container comprising a receptacle and a lid;

wherein a valve is fixed to the lid through an opening on the lid;

wherein the valve comprising a first annular flange, a second annular flange, a nipple, a hollow core, and a cap;

wherein the core separates the flanges from each other establishing a gap between the flanges;

wherein the nipple comprises a bore;

wherein the cap comprising a flange extending from the cap to frictionally seal inside the bore;

wherein a duckbill extending from the bore and including a slit; and, wherein the nipple further including a pair of hooks to further retain the cap when the flange of the cap is sealed inside the bore;

wherein the first annular flange comprises at least two flexible tapered flaps, and a connecting ledge between the flaps; and, wherein the connecting ledge includes a cutout to provide flexibility to the flexible tapered flaps.

15. The valve of claim 14, wherein at least one footing projecting from the second annular flange and a channel delimits the at least one footing for air flow to access the slit.

16. The valve of claim 14, wherein the second annular flange includes at least one tapered surface to provide a guide for insertion to a hole in the container.

17. The valve of claim 16, wherein the second annular flange comprises at least two retainers and the tapered surface being on each of the retainers.

18. The valve of claim 17, wherein an axial vent extends between the two retainers and the hollow core; and, wherein a radial vent extends partly along the first annular flange.

* * * * *